(12) United States Patent
Ezaki

(10) Patent No.: US 12,061,787 B2
(45) Date of Patent: Aug. 13, 2024

(54) DATA PROCESSING DEVICE AND DATA PROCESSING METHOD

(71) Applicant: Faurecia Clarion Electronics Co., Ltd., Saitama (JP)

(72) Inventor: Jitsu Ezaki, Saitama (JP)

(73) Assignee: Faurecia Clarion Electronics Co., Ltd, Saitama (JP)

( * ) Notice: Subject to any disclaimer, the term of this patent is extended or adjusted under 35 U.S.C. 154(b) by 11 days.

(21) Appl. No.: 18/167,530

(22) Filed: Feb. 10, 2023

(65) Prior Publication Data
US 2023/0273721 A1     Aug. 31, 2023

(30) Foreign Application Priority Data

Feb. 28, 2022  (JP) .................................. 2022-029538

(51) Int. Cl.
*G06F 3/0485*  (2022.01)
*G06F 3/0482*  (2013.01)

(52) U.S. Cl.
CPC .......... *G06F 3/0485* (2013.01); *G06F 3/0482* (2013.01)

(58) Field of Classification Search
None
See application file for complete search history.

(56) References Cited

U.S. PATENT DOCUMENTS

| | | | |
|---|---|---|---|
| 2010/0231534 A1 | 9/2010 | Chaudhri et al. | |
| 2010/0293501 A1* | 11/2010 | Russ | G06F 3/04886 715/803 |
| 2010/0299599 A1* | 11/2010 | Shin | G06F 3/0485 345/173 |
| 2012/0131497 A1 | 5/2012 | Jitkoff | |
| 2012/0151401 A1 | 6/2012 | Hwang | |
| 2013/0055127 A1* | 2/2013 | Saito | G06F 16/168 715/810 |
| 2015/0113480 A1* | 4/2015 | Krikke | G06F 9/451 715/830 |
| 2020/0142548 A1* | 5/2020 | Karunamuni | G06F 3/04883 |

FOREIGN PATENT DOCUMENTS

| | | |
|---|---|---|
| JP | 2012-521049 A | 9/2012 |
| JP | 2012-527686 A | 11/2012 |
| JP | 2013-543201 A | 11/2013 |
| JP | 2013-546093 A | 12/2013 |

* cited by examiner

*Primary Examiner* — Matthew Ell
*Assistant Examiner* — David V Luu
(74) *Attorney, Agent, or Firm* — Volpe Koenig

(57) ABSTRACT

A data processing device comprises: a displaying unit that displays various different screens; an operation receiving unit, which is layered on the displaying unit, that receives operation inputted from a user on the screen; an operation evaluating unit that evaluates contents of the operation by the user on the operation receiving unit; and a screen generating unit that generates a screen including a operation object, and changes the screen in response to the contents of an operation. The operation evaluating unit switches its mode from first mode of a default state to a second mode in response to a drag operation in the lengthwise direction of the operation object on the operation object on the screen, and evaluates an identical drag operation in a direction that is different from the lengthwise direction of the operation object to be different instruction operations between the first mode and the second mode.

3 Claims, 9 Drawing Sheets

DATA PROCESSING DEVICE AND DATA PROCESSING METHOD

FIELD OF INVENTION

The present invention relates to a data processing device and data processing method.

BACKGROUND

As a method for operating a touch panel, Patent Document 1, for example, describes an "operating method for mobile terminal equipment, being a touch-based operating method in mobile terminal equipment, including: a step for displaying, in a first direction, a communication link list having at least one item; a step for selecting a specific one of the at least one items in response to a first touch event; a step for confirming whether or not to produce a second touch event, in a second direction, on the specific one item that has been selected; and a step for performing a specific function, set in advance for the specific one item that has been selected, in response to the second touch event that has occurred in the second direction.

PRIOR ART REFERENCES

Patent Documents

[Patent Document 1] US 2010/0299599 A1

SUMMARY

In the technology described in Patent Document 1, one item from a list can be selected when, for example, a shift-drag operation is carried out in the vertical direction with the finger of the user still in contact with the screen, in a list screen wherein a plurality of items is arranged in a column. Following this, a process that is in accordance with the direction of the drag operation (the direction to the right or the direction to the left) can be executed with respect to the one item that has been selected by performing a drag operation in the horizontal direction on the one item that has been selected. In other words, two different processes can be executed selectively.

However, in the prior art, such as the technology disclosed in Patent Document 1, the direction of the drag operation in the list is controlled by the direction of the list, so there is little freedom in the drag operation. For example, the drag operation in a screen with a list that is arranged in a column is limited to being in only the vertical direction. Moreover, the drag operation on a single item that is selected through a drag operation in the vertical direction is limited to being in only the horizontal direction. Consequently, it is not possible to produce a UI (User Interface) such that the process to be performed on the single item that is selected from the vertical-direction list can be selected, through a drag operation in the vertical direction, from among multiple alternatives.

The present invention was created in contemplation of such a situation, and the object thereof is to improve the ease of operations for a user by expanding the flexibility of a drag operation.

Means for Solving the Problem

While the present application includes a plurality of means for solving, at least in part, the problem set forth above, an example thereof includes the following:

In order to solve the problems set forth above, a first aspect of the present invention is a data processing device comprising: a displaying unit that displays various different screens; an operation receiving unit, which is layered on the displaying unit, that receives operation inputted from a user on the screen; an operation evaluating unit that evaluates contents of the operation by the user on the operation receiving unit; and a screen generating unit that generates a screen including a operation object, and changes the screen in response to the contents of an operation. The operation evaluating unit switches its mode from first mode of a default state to a second mode in response to a drag operation in the lengthwise direction of the operation object on the operation object on the screen, and evaluates an identical drag operation in a direction that is different from the lengthwise direction of the operation object to be different instruction operations between the first mode and the second mode.

Effects of the Invention

This one aspect of the present invention enables an improvement in ease of operations for a user by expanding the flexibility of the drag operation.

Other objects, structures, and effects will become apparent through explanations of embodiments, below.

BRIEF DESCRIPTIONS OF THE DRAWINGS

FORMS FOR CARRYING OUT THE PRESENT INVENTION

One embodiment according to the present invention will be explained below based on the drawings. Note that in all drawings for explaining the embodiment, in principle identical reference symbols will be assigned to identical members, and redundant explanations thereof will be omitted as appropriate. Moreover, in the embodiments below, the structural elements (including elemental steps, and the like), unless explicitly indicated or clearly required in principle, are not absolutely necessary. Moreover, the terms "comprising A," "made from A," "having A," and "including A" do not indicate that other elements are necessarily absent, except for cases wherein it is indicated explicitly that there is only that element. Similarly, in the embodiment below references to shapes, positional relationships, or the like, of the structural elements, or the like, include also elements that approximate or are substantially similar to the shapes, unless explicitly stated or, by principle, one may believe otherwise.

<Example of Structure of Vehicle-Mounted Device 10 According to One Embodiment According to the Present Invention>

A vehicle-mounted device 10 according to one embodiment according to the present invention will be explained below.

Figure 1:
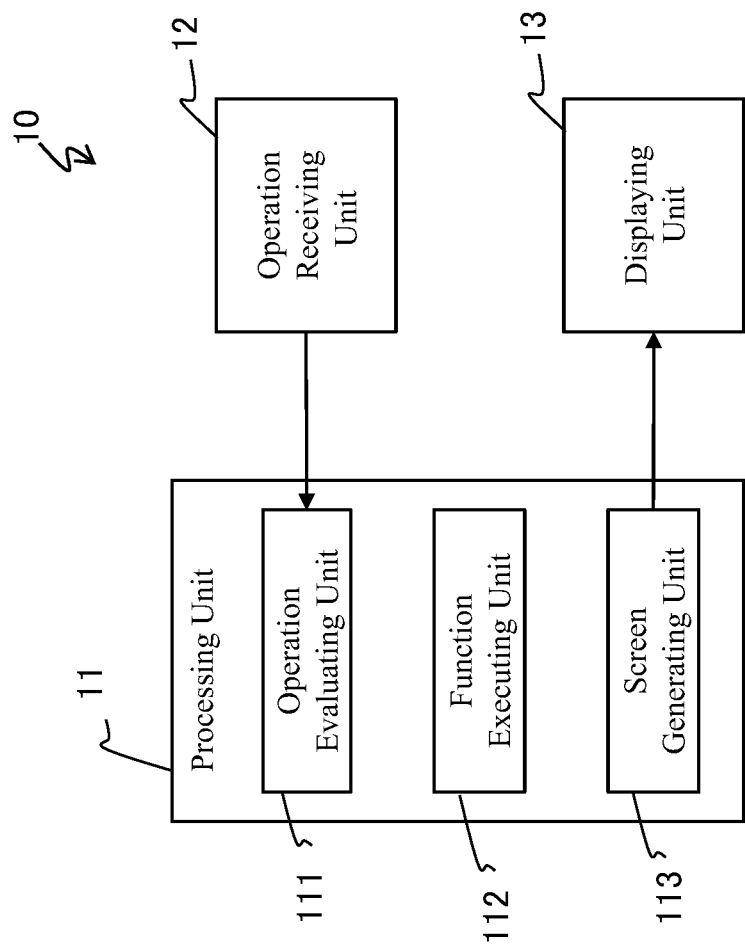
FIG. 1 is a block diagram showing an example configuration of functional blocks of a vehicle-mounted device according to one embodiment according to the present invention.

FIG. 1 depicts an example configuration of functional blocks of a vehicle-mounted device 10 according to one embodiment according to the present invention. The vehicle-mounted device 10 is an electronic device wherein a touch panel is layered on a display, and, during operation, is operated by a finger. The vehicle-mounted device 10 has, for example, a navigation function, a voice communication function, a music playback function, an air conditioner adjusting function, and functions for setting a variety of settings, and the like. The vehicle-mounted device 10 corresponds to the "data processing device" of the present invention.

Figure 2:
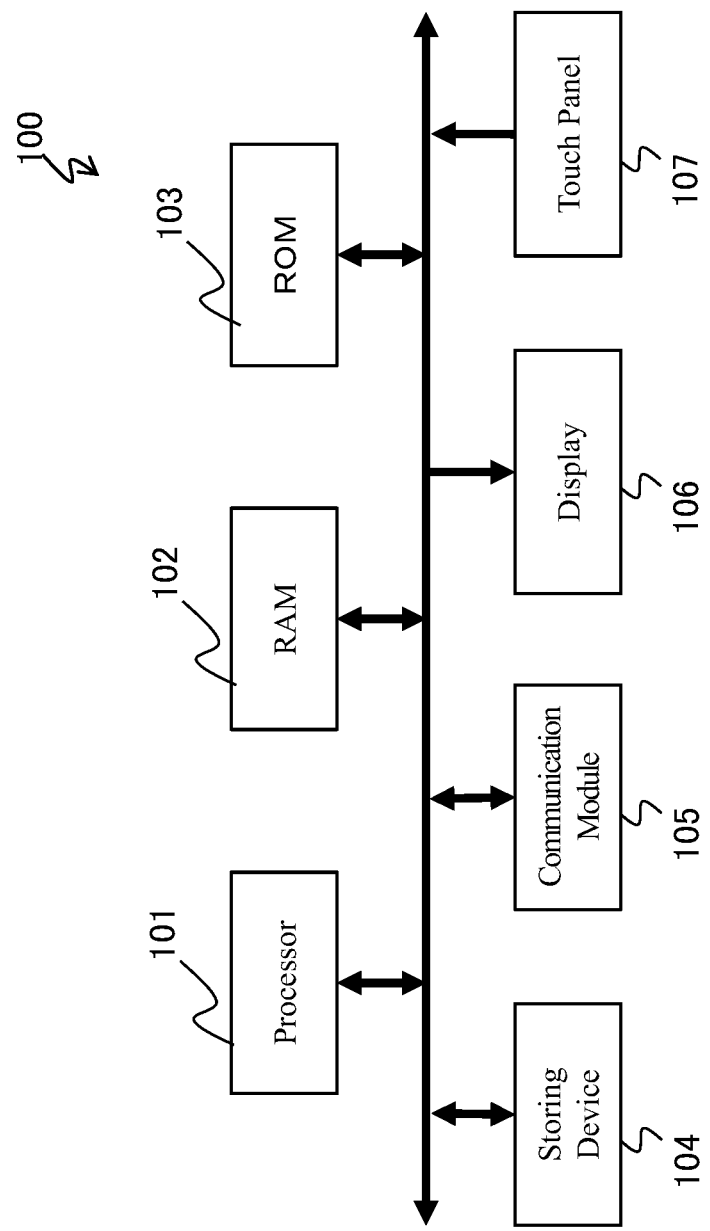
FIG. 2 is a diagram showing an example of a configuration of a computer.

The vehicle-mounted device 10 can be achieved through an ordinary computer. FIG. 2 depicts an example of a configuration of a computer 100 for embodying the vehicle-mounted device 10. The computer 100 is equipped with: a processor 101 such as a CPU (Central Processing Unit), or the like; a RAM (Random Access Memory) 102 for storing programs and data temporarily; a storing device 104, such as a ROM (Read-Only Memory), an HDD (Hard Disk Drive) or an SSD, a non-volatile memory card, or the like, for storing a boot program, or the like, to be run by the processor 101; a communication module 105 for carrying out communication through connecting to a network such as the Internet; a display 106 such as a liquid crystal display, an organic EL (Electro-Luminescence) panel, or the like; and a touch panel 107 that is layered on the display 106.

As depicted in FIG. 1, the vehicle-mounted device 10 is provided with a processing unit 11, an operation receiving unit 12, and a displaying unit 13. The processing unit 11 has various functional blocks of an operation evaluating unit 111, a function executing unit 112, and a screen generating unit 113.

The processing unit 11 is structured from the processor 101 of the computer 100. The operation evaluating unit 111, function executing unit 112, and screen generating unit 113 are achieved through execution of a prescribed program by the processor 101.

The operation evaluating unit 111 evaluates the contents of an operation from a user, based on an operation signal from the operation receiving unit 12. The function executing unit 112 executes processes relating to various types of functions, such as a navigation function, a voice communication function, a music playback function, an air conditioner adjusting function, functions for setting various types of settings, and the like, in response to specifics of an operation by a user. The screen generating unit 113 generates, and displays on the displaying unit 13, various types of screens based on processing by the function executing unit 112 and on results of evaluations of user operations by the operation evaluating unit 111.

The operation receiving unit 12 is made from the touch panel 107 of the computer 100, and outputs, to the operation evaluating unit 111 of the processing unit 11, an operation signal corresponding to an operation by a user (a drag operation, a touch operation, or the like). The displaying unit 13 is made from the display 106 of the computer 100, and displays various types of screens under control of the screen generating unit 113.

Note that each of the structural elements depicted in FIG. 1 is partitioned depending on the primary processing detail thereof, for ease in understanding the functions of the vehicle-mounted device 10 that is achieved in the present embodiment. Consequently, the present invention is not limited to the ways in which the individual structural elements are partitioned, nor by the names applied thereto. Additionally, each of the individual functional blocks of the vehicle-mounted device 10 may be partitioned into a greater number of functional blocks depending on the details of processing. Moreover, the partitioning may be such that more processes are carried out by a single functional block.

All or part of each functional block may be structured through hardware that is mounted into a computer (that is, through an integrated circuit known as an ASIC). The processes in each individual functional block may be executed by a single hardware element, or executed by a plurality of hardware elements.

<Drag Operations in a List Screen>

The handling of drag operations in a list screen 200 (FIG. 3) that is displayed on the displaying unit 13 of the vehicle-mounted device 10 will be explained next.

Figure 3:
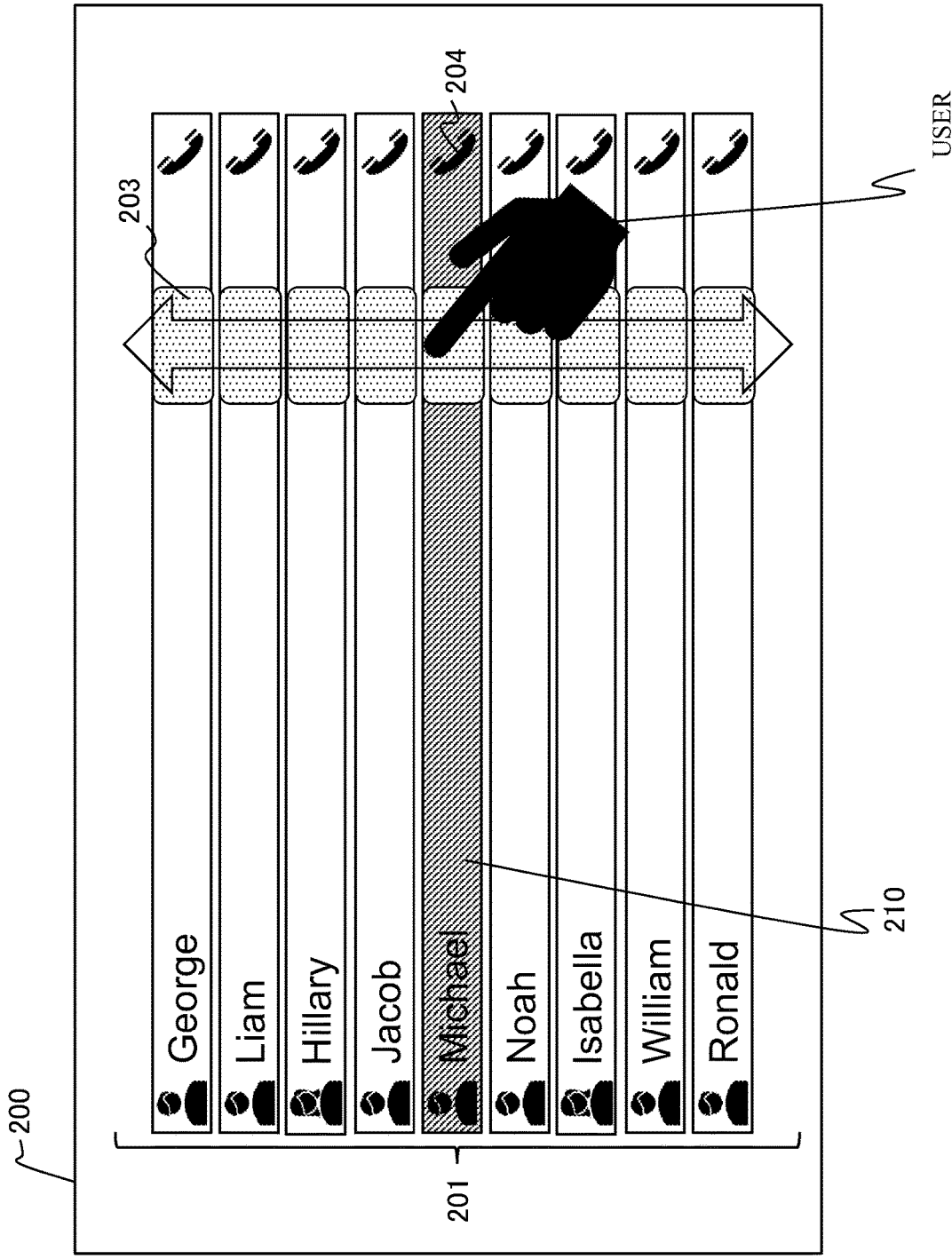
FIG. 3 is a diagram showing an example display of a list screen.
Figure 4:
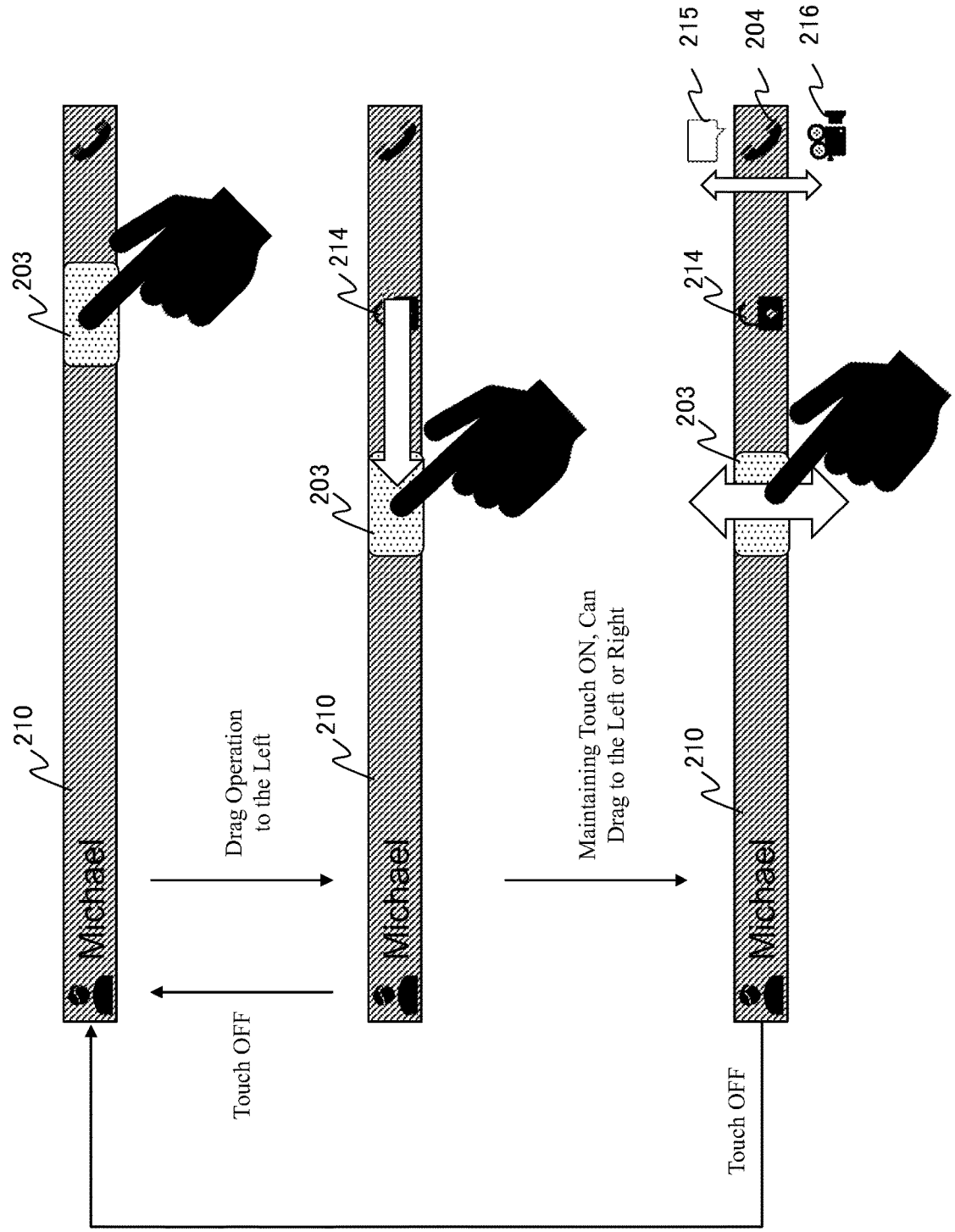
FIG. 4 is a diagram for explaining an example of a drag operation on the list screen.

FIG. 3 depicts an example display of a list screen 200. FIG. 4 is a diagram for explaining a drag operation by a user on the list screen 200.

An alternative list 201, wherein multiple alternatives are arranged in a column, is displayed on the list screen 200. Each alternative that is located in the alternative list 201 is provided with an operable region 203 that indicates a location for a user operation. A process icon 204, for displaying a typical process for the alternative, is displayed on the right side of each alternative. The provision of the operable region 203 is able to prevent an inadvertent operation by the user. However, the operable region 203 need not necessarily be provided separately. In such a case, the entirety of each alternative (the horizontal rectangular region that is provided in the column that is the alternative list 201) would be considered to be the operable region.

FIG. 3 is an example display of a list screen 200 that corresponds to voice communication functions. Names of individuals for whom telephone numbers, or the like, have been stored are displayed as the alternatives in the alternative list 201. A process icon 204 that means that a telephone call will be made is displayed, as the typical process for the alternative, on the right side of each alternative.

The user is able to scroll the alternative list 201 through a drag operation in the vertical direction in the list screen 200. This enables scrolling to move a desired alternative to the center of the alternative list 201, to select an alternative as an operation object 210 that is to be subjected to an operation. Note that the alternative in the alternative list 201 may be selected through a touch operation instead.

If, in the state that an alternative has been selected in the alternative list 201, the user were to perform a drag operation again in the vertical direction, the operation object 210 would be changed. Consequently, when the selection of the alternative in the alternative list 201 is to be maintained, the next drag operation can be considered to be limited to the horizontal direction of the operation object 210. In this specific context (which, in this case, is a context wherein the selection of the alternative is to be maintained), the state wherein the direction of the drag operation is limited shall be termed the "first mode." The default state in the list screen 200 is the first mode.

When the user performs a drag operation toward the right on the operable region 203 of the operation object 210 in the alternative list 201, the process indicated by the process icon 204 will be executed for the operation object 210. For example, in the case in FIG. 3, a telephone call will be placed to the alternative, "Michael," that is the operation object 210.

Note that the horizontal direction in FIG. 3 corresponds to the lengthwise direction of the operation object in the present invention, and the vertical direction in FIG. 3 corresponds to the direction that is perpendicular to the lengthwise direction of the operation object in the present invention. Note that the vertical direction (the direction that is perpendicular to the lengthwise direction) with respect to the horizontal direction (the lengthwise direction of the operation object) is not limited to only the case that is strictly perpendicular at 90°, but rather includes also the case of crossing at no less than a prescribed angle (for example, at 80° or more).

Next, as shown by the top and center in FIG. 4, when the user carries out a drag operation toward the left on the operable region 203 of the operation object 210, then, as shown at the bottom of FIG. 4, the limitation on the direction of the drag operation under the specific state (which, in this case, is the state wherein the selection of the alternative is to be maintained) is released, producing a state wherein a drag operation in the vertical direction is possible. The state wherein the limitation on the direction of the drag operation under the specific state has been released in this way is termed the "second mode."

The drag operation in the vertical direction, shown at the bottom of FIG. 4, is possible when the touch is maintained ON following the drag operation toward the left, shown in the middle in FIG. 4 (while the finger is in contact with the touch panel 107), but if the touch becomes OFF (the finger is removed from the touch panel 107), the mode is returned from the second mode to the first mode, and the operable region 203 is returned to the original position.

In the second mode, as shown at the bottom in FIG. 4, a release icon 214, indicating that the limitation on the direction of the drag operation has been released, is displayed on the operation object 210. A plurality of process icons 215, 204, and 216 for indicating processes that are selectable, for the operation object, through a drag operation in the vertical direction are displayed, arranged in a column, on the right side of the operation object 210.

For example, when the user carries out a drag operation in the downward direction from the state shown at the bottom in FIG. 4, the process icon 215 that indicates that a message is to be sent, is moved downward and displayed on the operation object 210. In this state, if the user performs a drag operation toward the right, a message will be sent to the alternative, "Michael." On the other hand, if the user performs a drag operation toward the top in the state shown at the bottom of FIG. 4, the process icon 216, which indicates a video call, will be moved upward and displayed on the operation object 210. If, in this state, the user performs a drag operation toward the right, a video call to the alternative "Michael" will be started.

<Processing when a List Screen is Displayed>

Figure 5:
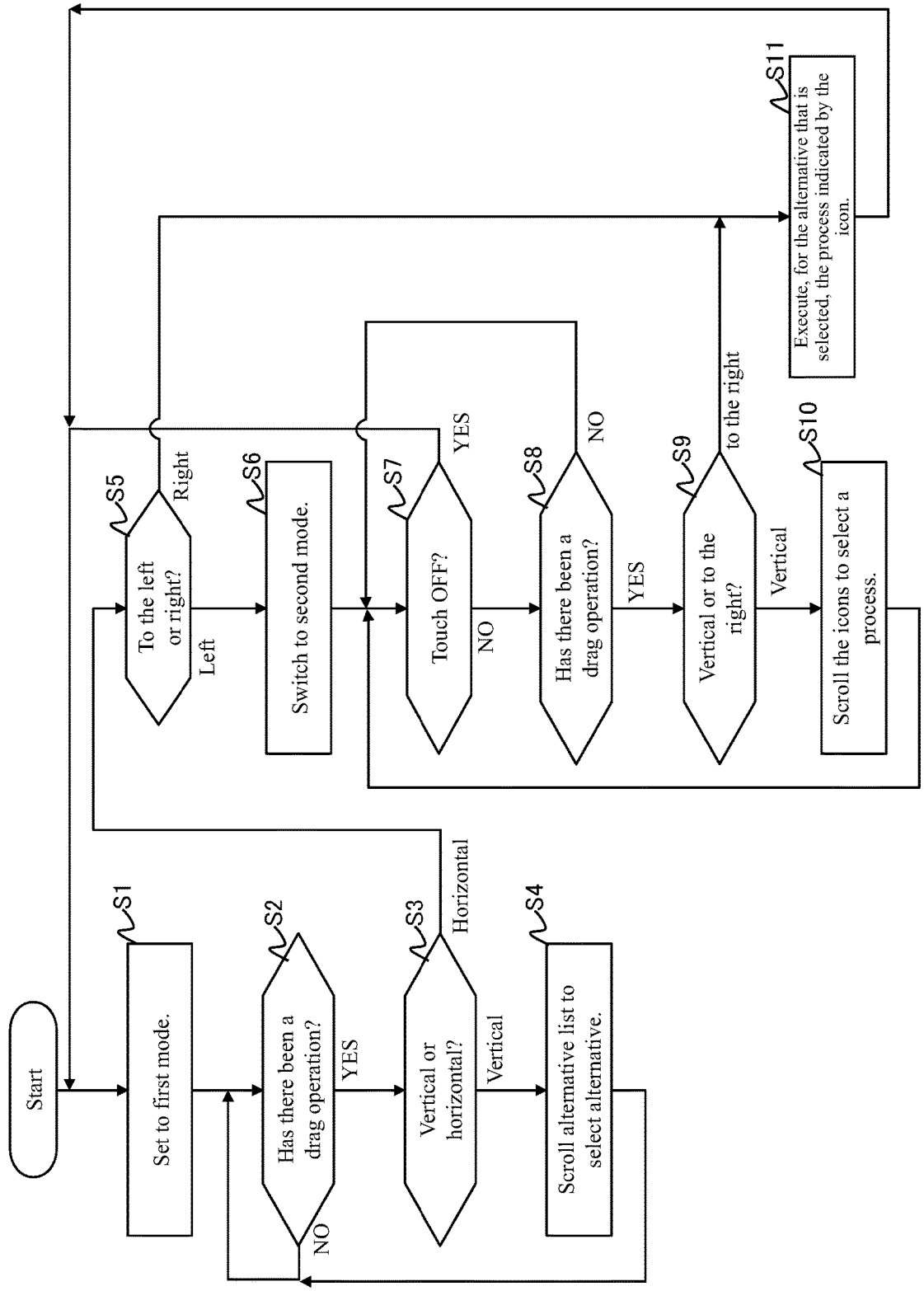
FIG. 5 is a flowchart for explaining an example of processing when the list screen is displayed.

FIG. 5 is a flowchart for explaining an example of processing when the list screen is displayed.

The processing when a list screen is displayed is started when a list screen 200 is generated by the screen generating unit 113 and displayed on the displaying unit 13, and is executed continuously as long as the list screen 200 is displayed.

First the operation evaluating unit 111 sets the operating mode of the default state to the first mode (Step S1).

Next, the operation evaluating unit 111 evaluates whether or not there is a drag operation by the user on an operable region 203 based on an operation signal from the operation receiving unit 12 (Step S2). If here the evaluation is that there is no drag operation (Step S2: NO), the evaluation is repeated, but if there is an evaluation that there is a drag operation (Step S2: YES), this is then followed by the operation evaluating unit 111 evaluating whether the drag operation by the user is in the vertical direction or the horizontal direction (Step S3).

If the evaluation in Step S3 is that the drag operation by the user is in the vertical direction, then, following this, the screen generating unit 113 scrolls the alternative list 201 in the list screen 200. The alternative that is moved to the center of the alternative list 201 by this scrolling is selected as the operation object 210 (Step S4). Thereafter, processing returns to Step S2, and is repeated starting with Step S2.

If the evaluation in Step S3 is that the drag operation by the user is in the horizontal direction, the operation evaluating unit 111 next evaluates whether the drag operation by the user is in the left direction or in the right direction (Step S5).

If, in Step S5, the evaluation is that the drag operation by the user is in the left direction, then, following this, the operation evaluating mode 111 switches the operating mode to the second mode (Step S6).

This switch to the second mode enables the user to perform a drag operation in the vertical direction, until the touch is OFF. As shown at the bottom of FIG. 4, a release icon 214, indicating that the limitation on the direction of the drag operation has been released, is displayed on the operation object 210 that is the alternative that is selected, and a plurality of process icons 215, 204, and 216, indicating processes on the alternative that is selected, are displayed, arranged in a column, on the right side of the operation object 210.

Following this, the operation evaluating unit 111 evaluates whether or not the touch is OFF (Step S7). If here the evaluation by the operation evaluating unit 111 is that the touch is OFF (Step S7: YES), processing returns to Step S1, and is repeated beginning with Step S1. In this case, the operating mode returns again to the first mode.

Conversely, if the evaluation by the operation evaluating unit 111 is that the touch continues to be ON (that the touch is not OFF) (Step S7: NO), the operation evaluating unit 111 then evaluates whether or not there is a drag operation by the user (Step S8). If here the evaluation is that there is no drag operation (Step S8: NO), processing returns to Step S7. If the evaluation is that there is a drag operation (Step S8: YES), the operation evaluating unit 111 evaluates whether the drag operation by the user is in the vertical direction or in the direction toward the right (Step S9).

If the evaluation here is that the drag operation by the user is in the vertical direction, the screen generating unit 113 then scrolls the plurality of icons 216 that are displayed in a vertical column on the right side of the operation object 210 that is the alternative that is selected in the list screen 200. The process corresponding to the process icon that is moved onto the operation object 210 through this scrolling is selected as the process for the operation object 210 (Step S10). Processing thereafter returns to Step S7, and is repeated starting with Step S7.

Conversely, if, in Step S9, the evaluation is that the drag operation by the user is in the direction to the right, that the function executing unit 112 executes, with respect to the operation object 210, the process that corresponds to the selected process icon (Step S11). Processing then returns to Step S1, and is repeated starting with Step S1.

If, in Step S5, the drag operation of the user is evaluated as being in the direction toward the right, the function executing unit 112 executes, with respect to the operation object 210, the typical process indicated by the process icon 204 (Step S11). Processing then returns to Step S1, and is repeated starting with Step S1.

The processing when the list screen is displayed, explained above, enables the operating mode to be switched from the first mode to the second mode through a drag operation to the left on the operable region 203 of the operation object 210. Doing so causes the limitation on the drag operation to be released temporarily, expanding the flexibility of drag operations, thus improving the ease of operation for the user. Specifically, the user is able to switch to the second mode through a drag operation in the direction toward left, after selecting an alternative through a drag operation in the vertical direction. That is, the user is able to carry out, on a list screen, a series of operations up through selection of a process for an alternative that is selected, through a drag operation in the vertical direction. The result is the ability to eliminate displays of screens other than the list screen, such as pop up screens, and the like, which require cumbersome operations by the user, when selecting a process to be performed with respect to the alternative that is selected.

<Drag Operations in a Split Screen>

The handling of drag operations in a split screen 300 (FIG. 6) that is displayed on the displaying unit 13 of the vehicle-mounted device 10 will be explained next.

Figure 6:
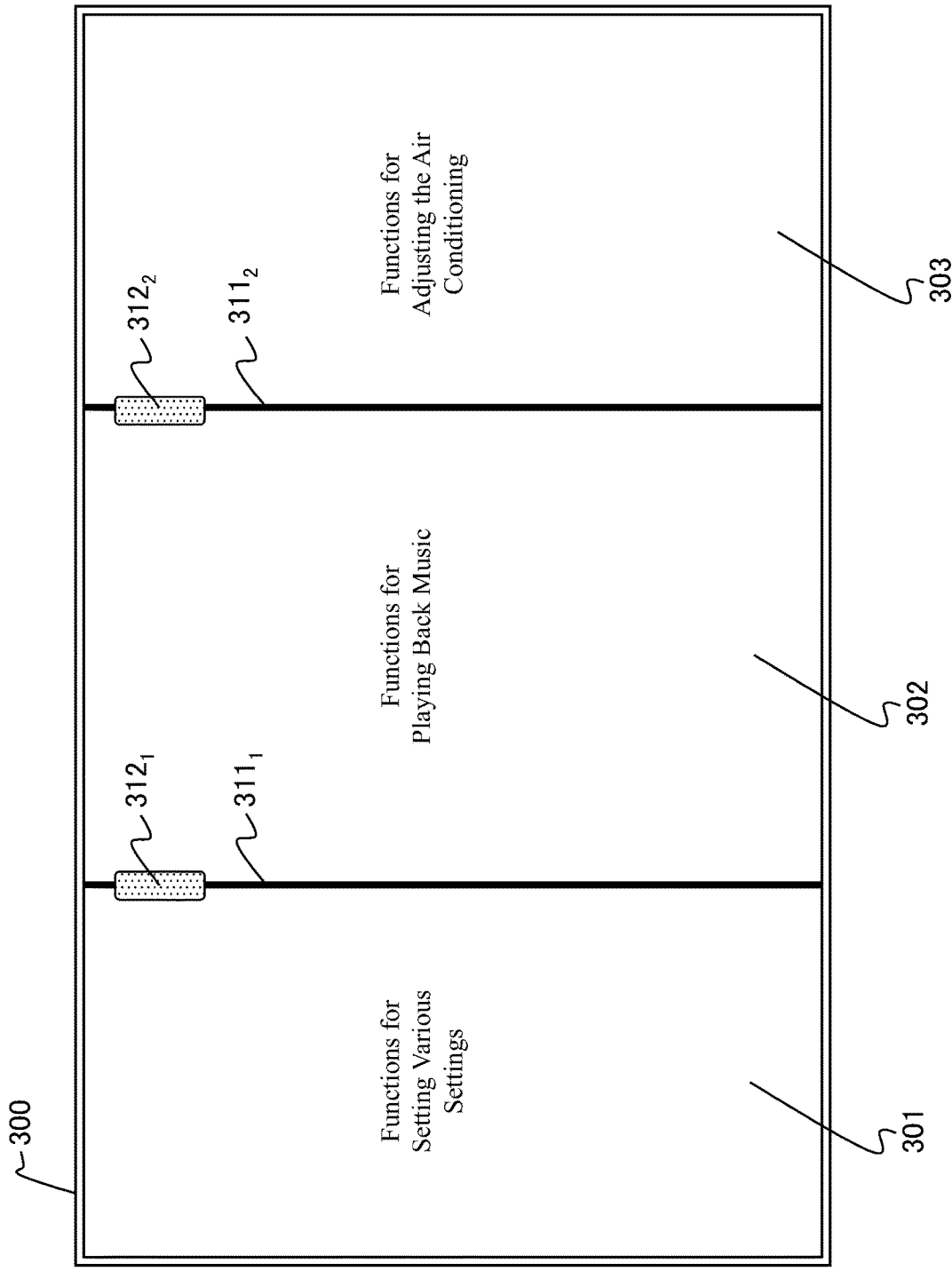
FIG. 6 is a diagram showing an example of a display of a split screen.

FIG. 6 depicts an example display of a split screen 300.

The split screen 300 is a screen wherein the display region of the displaying unit 13 is split into a plurality of split regions, where information corresponding to different functions (navigation functions, voice communication functions, music playback functions, air conditioner adjusting functions, functions for setting a variety of settings, and the like) is displayed in each of the split regions. In the split screen 300 the user is able to move, through a drag operation, the boundary line between the split regions.

In the case in FIG. 6, the split screen 300 is split into three split regions 301 through 303. Functions for setting various types of settings are assigned to split region 301, music playback functions are assigned to split region 302, and air conditioner adjusting functions are assigned to split region 303.

An operable region $312_1$, indicating the position for a user operation on the boundary line $311_1$, as a operation object, is provided on the boundary line $311_1$ between the split regions 301 and 302. Similarly, an operable region $311_2$, indicating the position for a user operation on the boundary line $311_1$, as a operation object, is provided on the boundary line $311_2$ between the split regions 302 and 303. The provision of the operable regions $312_1$ and $312_2$ is able to prevent an inadvertent operation by the user. In the below, the boundary lines $311_1$ and $311_2$ will be referred to, together, as simply "boundary lines 311," when it is not necessary to distinguish between the individual boundary lines $311_1$ and $311_2$. The same is true for the operable regions $312_1$ and $312_2$. The operable regions 312 are not limited to being located at the tops of the boundary lines 311, as depicted in the figure, but instead may be located at the bottoms.

The vertical direction in FIG. 6 corresponds to the lengthwise direction of the operation object in the present disclosure, and the horizontal direction in FIG. 6 corresponds to the direction that is perpendicular to the lengthwise direction of the operation object in the present disclosure. The perpendicular direction (the direction that is perpendicular to the vertical direction) with respect to the vertical direction (the lengthwise direction of the operation object) is not limited to only the case that is strictly perpendicular, but rather includes also the case of crossing at no less than a prescribed angle (for example, at 80°).

Figure 7:
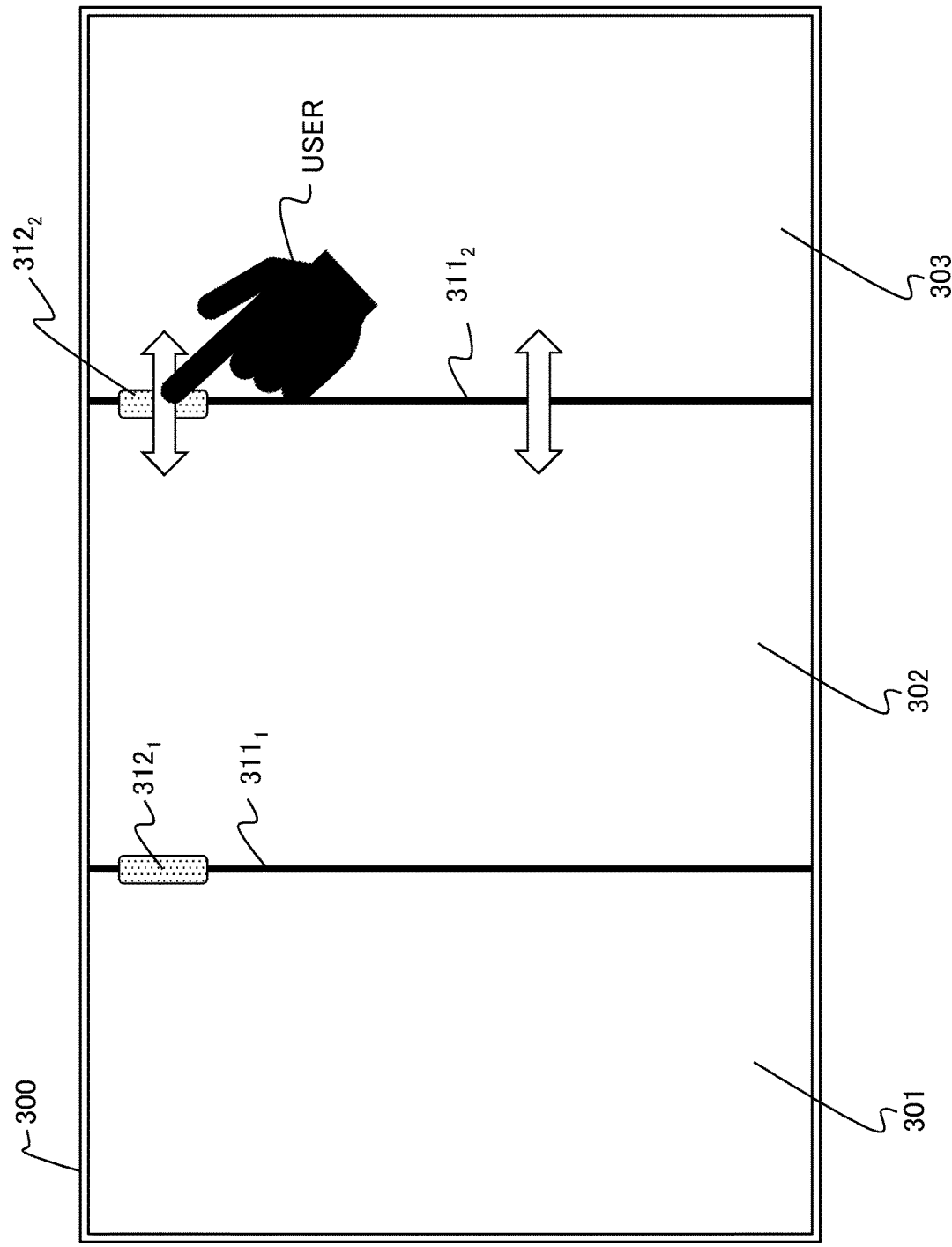
FIG. 7 is a diagram for explaining an example of a drag operation on the split screen.

FIG. 7 is a diagram for explaining asynchronous movement of the boundary lines in the split screen 300 (a first mode). As depicted in this figure, the user is able to move the boundary line 311 that is the operation object in the horizontal direction through performing a drag operation in the horizontal direction on the operable region 312 of the initial position. For example, the split region 301 can be made larger (making the split region 302 smaller at the same time) through an operation wherein the operable region $312_1$ is dragged toward the right from the initial position. Additionally, for example, the split region 302 can be made larger (making the split region 301 smaller at the same time) through an operation wherein the operable region $312_1$ is dragged toward the left from the initial position.

Figure 8:
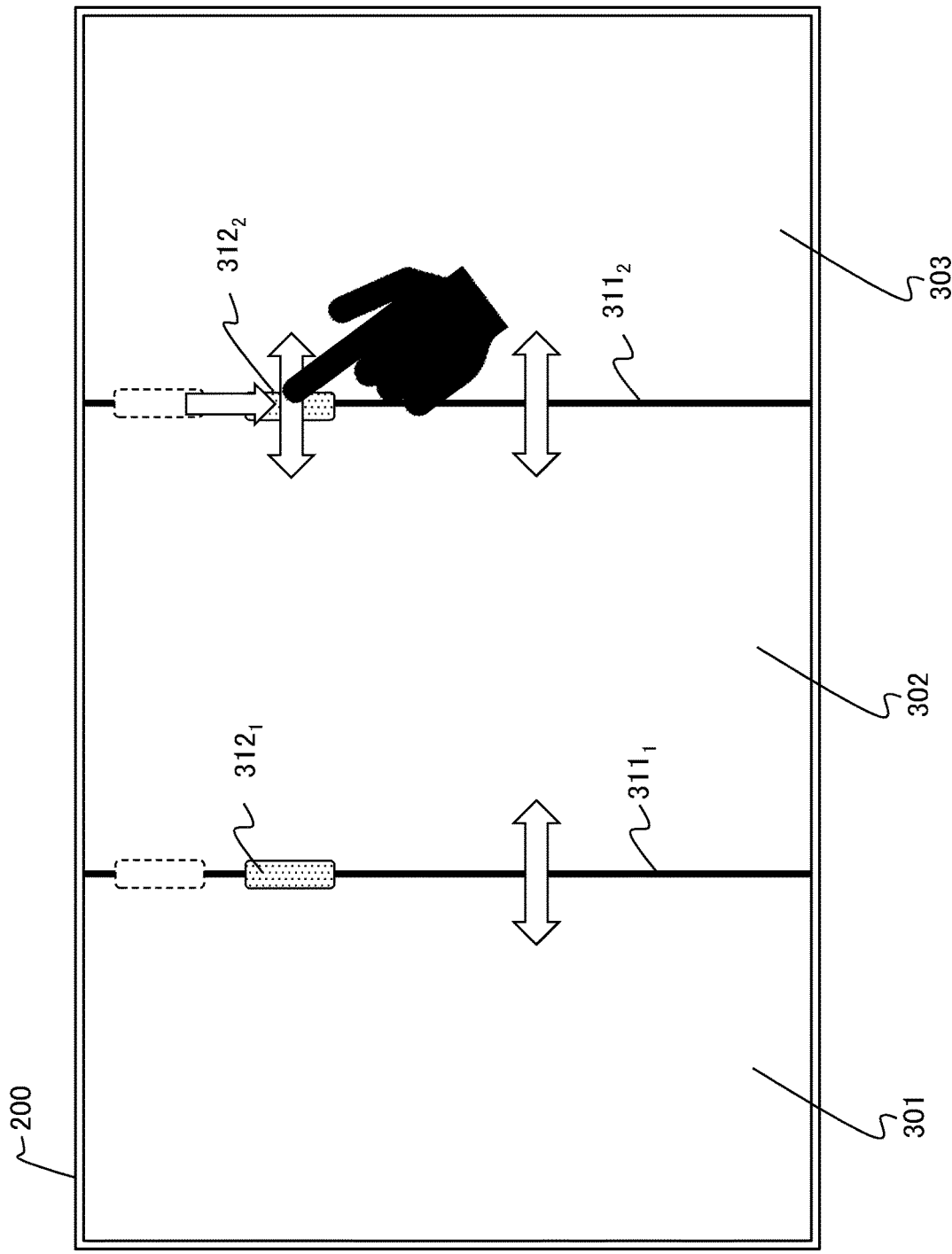
FIG. 8 is a diagram for explaining an example of a drag operation on the split screen.

FIG. 8 is a diagram for explaining synchronized movement of the boundary lines in the split screen 300 (a second mode). As depicted in this figure, the user is able to switch, from the first mode (asynchronous movement of the boundary lines) that is the default state to a second mode (synchronous movements of the boundary lines) through performing a drag operation in the vertical direction (the downward direction in the case in this figure), with respect to the initial position, on an operable region 312 (for example, the operable region $312_2$). In this case, the operable region 312 (which, in this case, is the operable region $312_1$) that is not subjected to the drag operation in the vertical direction (which is the downward direction in the case in this figure) is also moved in the downward direction synchronized with the movement of the operable region 312 on which the drag operation is performed (which, in this case, it is the operable region $312_2$). When the user performs a drag operation on an operable region 312 in the horizontal direction in a state wherein the touch ON is maintained, both the boundary line 311 that is the operation object (which, in this case, is the boundary line $311_2$) and the other boundary line 311 (which, in this case, is the boundary line $311_1$) are moved simultaneously in the horizontal direction. In the second mode, the user is able to switch the operating mode back from the second mode to the first mode by a touch OFF or by returning the operable region 312 back to the initial position through a drag operation in the upward direction.

For example, when the user performs a drag operation in the direction toward the left after switching to the second mode through performing a drag operation in the downward direction on the operable region $312_2$ at the initial position, the boundary lines $311_1$ and $311_2$ are synchronously moved toward the left. This makes the split region 301 smaller, moves the split region 302 toward the left while maintaining the size thereof, and makes the split region 303 larger. Conversely, when the user performs a drag operation in the direction toward the right after switching to the second mode, the boundary lines $311_1$ and $311_2$ are synchronously moved toward the right. This makes the split region 301 larger, moves the split region 302 toward the right while maintaining the size thereof, and makes the split region 303 smaller.

<Processing when a Split Screen is Displayed>

Figure 9:
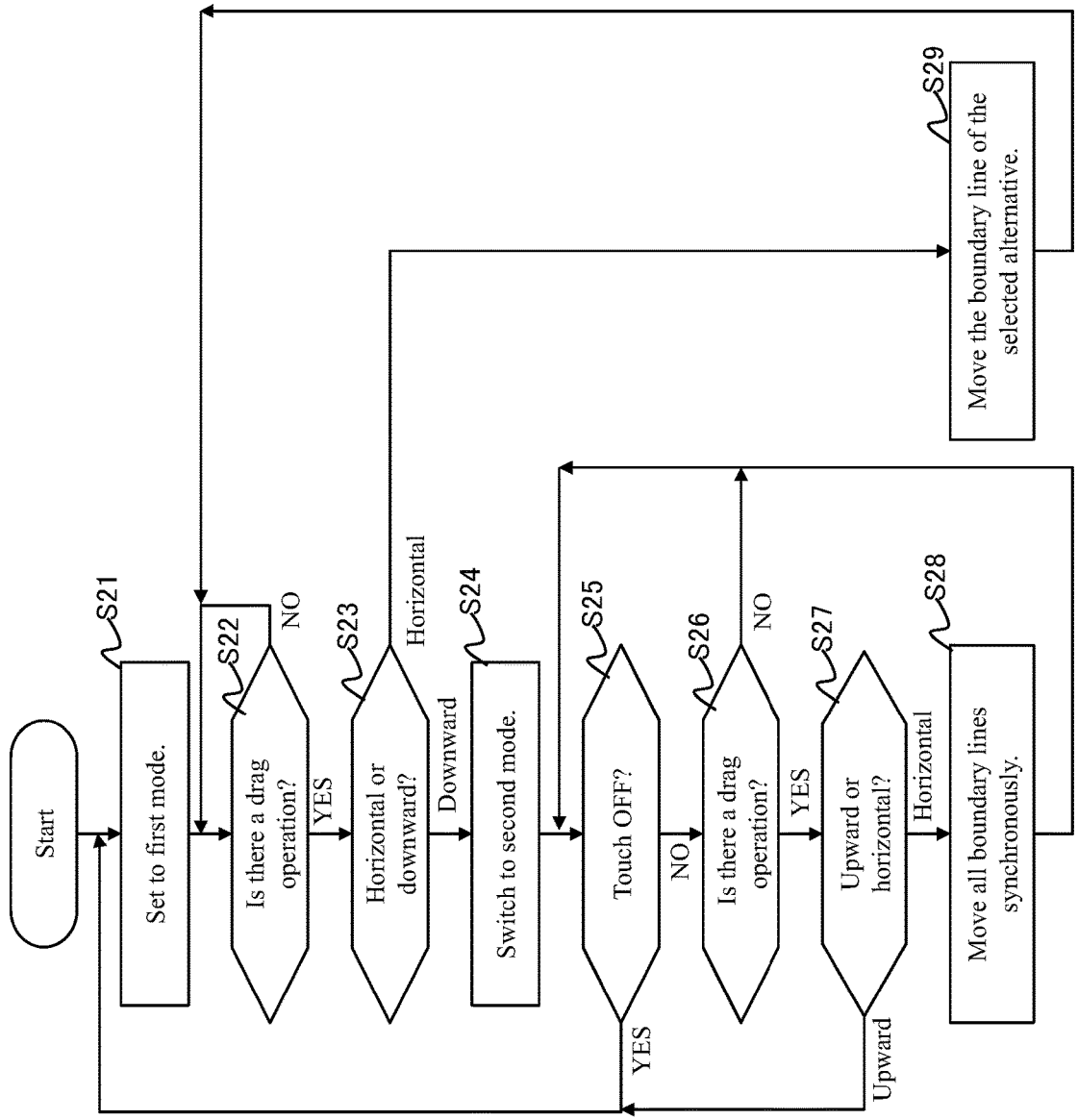
FIG. 9 is a flowchart for explaining an example of processing when a split screen is displayed.

FIG. 9 is a flowchart for explaining an example of processing when a split screen is displayed.

The processing when a split screen is displayed is started when a split screen 300 is generated by the screen generating unit 113 and displayed on the displaying unit 13, and is executed continuously as long as the split screen 300 is displayed.

First the operation evaluating unit 111 sets the operating mode to the first mode wherein the boundary lines 311 are moved asynchronously (Step S21).

Next, the operation evaluating unit 111 evaluates whether or not there is a drag operation by the user on an operable region 312 based on an operation signal from the operation receiving unit 12 (Step S22). If here the evaluation is that there is no drag operation (Step S22: NO), the evaluation is repeated, but if there is an evaluation that there is a drag operation (Step S22: YES), this is then followed by the operation evaluating unit 111 evaluating whether the drag operation by the user is in the downward direction or the horizontal direction (Step S23).

If here the evaluation is that the drag operation by the user is in the downward direction, then the operation evaluating unit 111 switches the operating mode to the second mode, for moving all of the boundary lines 311 synchronously (Step S24).

Following this, the operation evaluating unit 111 evaluates whether or not the touch is OFF (Step S25). If here the evaluation by the operation evaluating unit 111 is that the touch is OFF (Step S25: YES), processing returns to Step S21, and is repeated beginning with Step S21. In this case, the operating mode returns again to the first mode.

Conversely, if the evaluation is that the touch continues to be ON (that the touch is not OFF) (Step S25: NO), the operation evaluating unit 111 then evaluates whether or not there is a drag operation by the user (Step S26). If here the evaluation is that there is no drag operation (Step S26: NO), processing returns to Step S25. If the evaluation is that there is a drag operation (Step S26: YES), the operation evaluating unit 111 evaluates whether the drag operation by the user is in the upward direction or in the horizontal direction (Step S27).

If here the evaluation is that the drag operation by the user is in the horizontal direction, the screen generating unit 113 then synchronizes all of the boundary line 311 of the split screen 300 and moves them in the direction of the drag operation (Step S28). Thereafter, processing returns to Step S25, and is repeated starting with Step S25.

If, in Step S27, the evaluation is that the drag operation by the user is in the upward direction, processing returns to Step S21, and is repeated starting with Step S21. In this case, the operating mode returns again to the first mode.

If, in Step S23, the evaluation is that the drag operation by the user is in the horizontal direction, then the screen generating unit 113 moves, in the direction of the drag operation, the boundary line 311 that corresponds to the operable region 312 that was subjected to the drag operation (Step S29). Thereafter, processing returns to Step S22, and is repeated starting with Step S22.

The processing when a split screen is displayed, explained above, enables the operating mode to be switched to the second mode through a drag operation, in the downward direction, on an operable region 312 on a boundary line 311, improving the ease of operations for the user. Specifically, through a drag operation in the horizontal direction on an operable region 312 on a boundary line 311, the user is able to move the boundary line 311 by itself, or is able to move all of the boundary lines 311 synchronously after switching to the second mode.

Each of the various structures, functions, processing units, processing means, and the like described above may be achieved, in whole or in part, through hardware through, for example, an integrated circuit. The various structures, functions, and the like, described above, may be achieved through software through interpreting and executing a program for achieving the respective functions. Information such as programs, evaluation tables, files, and the like, for achieving the individual functions are placed in a memory, a storing device such as an HDD or SSD, or a recording medium such as an IC card, SD card, DVD, or the like. Control lines or data lines are noted when deemed necessary for the explanation, but not all control lines or data lines in the product are necessarily shown. In practice, substantially all of the structures can be thought of as being mutually connected.

The present invention is not only a data processing device, but rather may be provided in a variety of forms, such as a data processing method by a data processing device, a program that can be read by a computer, or the like.

EXPLANATION OF REFERENCE SYMBOLS

10: Vehicle-Mounted Device
11: Processing Unit
111: Operation Evaluating Unit
112: Function Executing Unit
113: Screen Generating Unit
12: Operation Receiving Unit
13: Displaying Unit

The invention claimed is:

1. A data processing device comprising:
a display that displays various different screens;
a touch panel, which is layered on the display, that receives an operation inputted from a user on the display;
a memory; and
a processor communicatively coupled to the display, the touch panel and the memory, the processor is configured to
evaluate contents of the operation by the user on the touch panel,
generate a screen of the various different screens including an operation object, and changes the screen in response to the contents of the operation,
switch from a first mode of a default state to a second mode in response to a first drag operation in the lengthwise direction of the operation object on the operation object on the screen,
evaluates a second drag operation in a direction that is different from the lengthwise direction of the operation object in the first mode and the second drag operation in the second mode as a different drag operation,
in the first mode, evaluate the second drag operation on the operation object to be an operation for moving the operation object on which the drag operation is evaluated, and
in the second mode, evaluate the second drag operation on the operation object to be an operation for moving synchronously a plurality of operation objects including the operation object on which the drag operation is evaluated and another operation object on which the drag operation is not evaluated.

2. The data processing device according to claim 1, wherein the processor is further configured to
generate a split screen wherein a display region is split into a plurality of split regions,
in the first mode, evaluate the second drag operation on a boundary line between split regions in a direction that is perpendicular to the boundary line as the drag operation on the operation object to be an operation for moving the boundary line on which the drag operation is evaluated, and
in the second mode, evaluate the second drag operation in a direction perpendicular to the boundary line on the boundary line as the drag operation on the operation object to be an operation for moving synchronously a plurality of boundary lines including the boundary line on which the drag operation is evaluated and another boundary line on which the drag operation is not evaluated.

3. A data processing method executed in a data processing device comprising a display that displays various different screens, and a touch panel, which is layered on the display, that receives an operation inputted from a user on the display and a processor communicatively coupled to the display and the touch panel, the method including:
an operation evaluating step that evaluates contents of the operation by the user on the touch panel; and
a screen generating step that generates a screen of the various different screens including an operation object, and changes the screen in response to the contents of the operation;
wherein the operation evaluating step includes the steps of:
switching from a first mode of a default state to a second mode in response to a first drag operation in the lengthwise direction of the operation object on the operation object on the screen,
evaluating a second drag operation in a direction that is different from the lengthwise direction of the operation object in the first mode and the second drag operation in the second mode as a different drag operation,
evaluating in the first mode, the second drag operation on the operation object to be an operation for moving the operation object on which the drag operation is evaluated, and
evaluating in the second mode, the second drag operation on the operation object to be an operation for moving synchronously a plurality of operation objects including the operation object on which the drag operation is evaluated and another operation object on which the drag operation is not evaluated.

* * * * *